(No Model.)
H. T. BUSH.
TRAP.
No. 526,991. Patented Oct. 2, 1894.
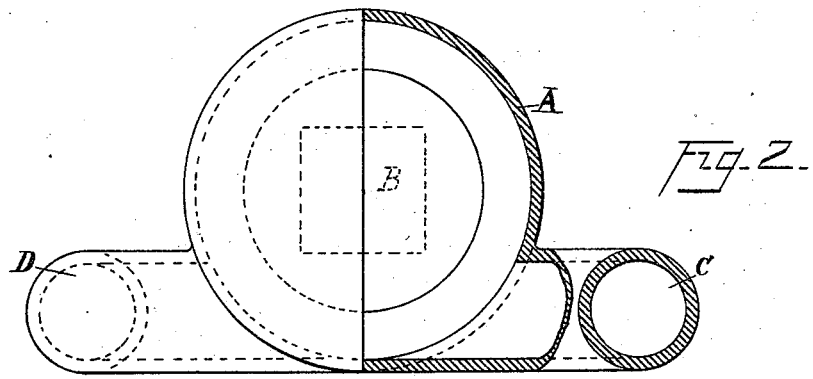
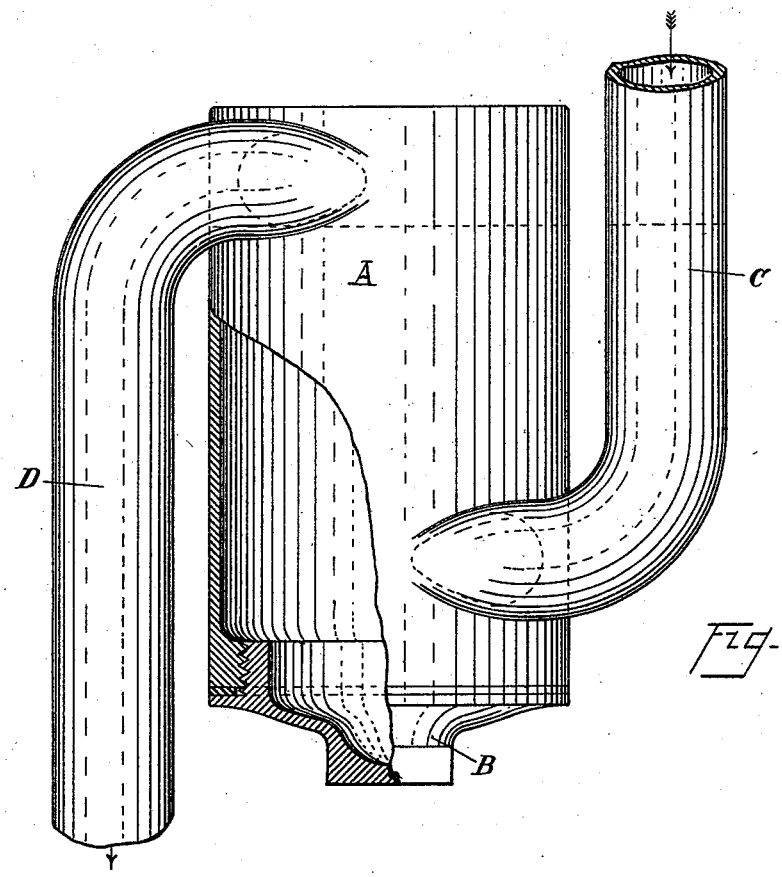

UNITED STATES PATENT OFFICE.

HIRAM T. BUSH, OF DETROIT, MICHIGAN, ASSIGNOR TO THE IDEAL MANUFACTURING COMPANY, OF SAME PLACE.

TRAP.

SPECIFICATION forming part of Letters Patent No. 526,991, dated October 2, 1894.

Application filed December 2, 1893. Serial No. 492,622. (No model.)

*To all whom it may concern:*

Be it known that I, HIRAM T. BUSH, of Detroit, in the county of Wayne and State of Michigan, have invented a new and useful Improvement in Traps, of which the following is a specification.

My invention consists in an improvement in traps, hereinafter fully described and claimed.

Figure 1 is a side elevation, partly in section, and Fig. 2 is a top plan view, with the right hand half in section.

A represents the body of the trap, made of metal or other suitable material, and preferably closed at its bottom by a screw cap B with the ordinary gasket.

C represents a waste pipe from the bowl or tub, leading into trap A near its bottom, and D represents a waste pipe leading out from the trap near its top.

The pipe C is connected with the trap A tangentially, as shown in Figs. 1 and 2, so that as water enters trap A from pipe C, a rotary motion is imparted to it, the result of which is that all matters carried in the water, which are lighter than the water, are thrown by centripetal force to the center of the trap A, and pass through said trap without coming in contact with the sides, and that if any liquid or semi-liquid object rests in contact with the side of the trap A, the rotary motion of the water tends to dislodge it therefrom, and permits it to be carried off through waste pipe D. The rotary motion of the water in trap A also renders it impossible to siphon said trap, as the tendency of said rotary motion is to create a core in the center of the trap, through which any air drawn down through pipe C passes to the waste pipe D without first lifting the water out of trap A.

The waste pipe D may be connected with trap A as shown in the drawings, or in the ordinary method. I rather prefer the tangential connection, shown.

What I claim as my invention, and desire to secure by Letters Patent, is—

A trap consisting of a tight vessel, an inlet-pipe tangentially entering said vessel near its lower part, and an outlet-pipe leading out through the wall of the vessel above the level of the inlet-pipe, substantially as described.

HIRAM T. BUSH.

Witnesses:
HENRY B. LOTHROP,
AMELIA WILLIAMS.